Figure 1:
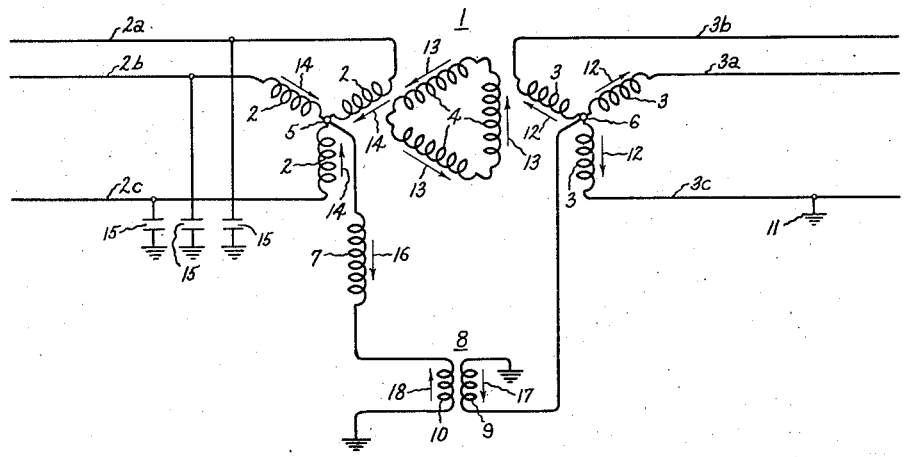

Nov. 25, 1947.  P. H. LIGHT  2,431,572

PROTECTION OF ALTERNATING CURRENT ELECTRIC POWER SYSTEMS

Filed May 4, 1946  2 Sheets-Sheet 1

Inventor:
Philip H. Light,
by Prowell S. Mack
His Attorney.

Nov. 25, 1947.    P. H. LIGHT    2,431,572
PROTECTION OF ALTERNATING CURRENT ELECTRIC POWER SYSTEMS
Filed May 4, 1946    2 Sheets-Sheet 2

Inventor:
Philip H. Light,
by *Prowell S. Mack*
His Attorney.

Patented Nov. 25, 1947

2,431,572

UNITED STATES PATENT OFFICE 2,431,572

PROTECTION OF ALTERNATING CURRENT ELECTRIC POWER SYSTEMS

Philip H. Light, Schenectady, N. Y., assignor to General Electric Company, a corporation of New York Application May 4, 1946, Serial No. 667,279

6 Claims. (Cl. 171—97)

My invention relates to improvements in the protection of alternating current electric power systems, and especially systems which include a polyphase multiwinding transformer or a bank of single phase multiwinding transformers having a low zero-phase sequence reactance relatively to the positive-phase sequence magnetizing reactance and at least two sets of star-connected windings to which two polyphase circuits are respectively connected, and more particularly my invention relates to improvements in protection when to at least one set of star-connected windings there is connected a circuit of the type wherein a fault to ground on a phase conductor of the circuit substantially increases the capacitance current to ground of the ungrounded phase conductors and wherein it is desired to ground the other set of windings either directly or through an impedance.

In power systems which operate without a neutral point grounded more or less directly, single conductor-to-ground faults of a transitory or arcing character may be suppressed by a ground fault neutralizing device, as disclosed in United States Letters Patent 1,537,371, without interruption of service. Since a large percentage of the faults on alternating current electric systems involve initially, at least, only a single conductor-to-ground, such neutralizing device materially improves the service continuity factor. The neutralizing device is usualy connected between a neutral point of the system and ground and proportioned to have together with the transformer affording the neutral point, a zero-phase sequence inductance such as to provide on the occurrence of a ground on a phase conductor of the system a lagging current for effectively suppressing the capacitance current to ground of the ungrounded phase conductors. Usually the amount of the inductance furnished by the transformer in the neutralizer connection is a small proportion of the total inductance in this connection. In order to take care of faults which the ground fault neutralizer cannot suppress, a low impedance connection to ground may be established after the flow of lagging current in the neutralizer connection for a predetermined time without suppressing the ground fault, as disclosed in United States Letters Patent 1,378,557, 2,258,- 251 and 2,296,109, for example. This low impedance connection allows sufficient flow of fault current to insure the intended operation of ground fault responsive relays with which the system is usually provided to clear permanent ground faults. Of course, when this low impedance connection is established, there is a relatively heavy current flow in comparison with the lagging current flow. If the neutral point to which the ground fault neutralizer is connected is in a transformer comprising, for example, two sets of star-connected windings and a set of delta-connected windings and the zero-phase sequence reactance of the transformer is low relatively to the positive-phase sequence magnetizing reactance or, in other words, if the current to ground in case of single conductor-to-ground faults is high relatively to the magnetizing current of the transformer, then the mutual coupling between the windings induces voltages in the windings of the other star-connected set. If there is a ground fault neutralizer connected between the neutral point of this other set of star-connected windings and ground, then since the resultant capacitance to ground of each of the phase conductors of the circuit connected to this other set of star-connected windings and the ground fault neutralizer are in resonance, such relatively high voltages may be produced as to impair the system insulation. If the neutral point of the first set of star-connected windings is normally operated with a low impedance ground connection, and the other set of star-connected windings is normally operated with the ground fault neutralizer connection, then the same condition will prevail on the occurrence of a ground fault on the phase conductor of the circuit connected to the first set of star-connected windings. This situation becomes especially critical when it is desired to change from a directly grounded system to a system using the ground fault neutralizer because any three-winding transformers already installed are likely to have been built without any consideration of the necessity for correctly proportioning the zero-phase sequence reactances. Likewise, the situation also requires careful study even in the installation of new apparatus if the transformer is built by someone other than the one who builds the ground fault neutralizer and who consequently is not in a position to select or determine the reactance characteristics of the transformer. The insulation break-down possibilities mentioned may occur also in a polyphase core type transformer mounted in one tank and having two sets of star-connected windings since in such a transformer the core and tank may furnish such a low reluctance path for the zero-phase sequence flux that the transformer has relatively low impedance to the currents flowing to ground.

Protective arrangements designed to take care of the foregoing conditions are disclosed in United States Letters Patent 2,296,099 and 2,296,109. However, the arrangements disclosed in these patents require either an additional grounding transformer or relay interlocking between the arrangements for by-passing the ground fault neutralizers.

While my invention is specifically devised for the protection of circuits under the conditions herein outlined, its application is not limited solely to arrangements wherein the neutral of one or both of the star-connected windings is connected to ground through a ground fault neutralizer as will be more clearly apparent hereinafter.

One object of my invention is to provide an improved arrangement for protecting a polyphase alternating current system so that grounding arrangements and particularly grounding arrangements embodying ground fault neutralizers may safely be used in connection with transformers such, for example, as those mentioned wherein the proportioning of the transformer reactances results in such mutual coupling as to endanger the system insulation on the occurrence of a ground fault on the system. This and other objects of my invention will appear in more detail hereafter.

In accordance with my invention, I provide for a polyphase alternating current system comprising a transformer having at least two sets of star-connected windings and a low zero-phase sequence reactance relatively to its positive-phase sequence magnetizing current and two polyphase circuits respectively connected to said sets of windings, a protective arrangement whereby the star point of each set may normally be connected to ground either directly or through a ground fault neutralizer which can be by-passed on the occurrence of nontransitory grounds without danger to the insulation of the parts of the system metallically connected to the transformer. Also in accordance with my invention, I provide an auxiliary two-winding transforming device which has its windings respectively connected in opposed order in the neutral-to-ground connections of the two sets of star-connected windings. Further in accordance with my invention, this transforming device has a low magnetizing reactance and its two windings are so connected and proportioned as to impose on either neutral-to-ground connection a zero-phase sequence voltage substantially equal and opposite in phase to the zero-phase sequence voltage imposed on either connection by the mutual inductance of the power transformer windings upon the occurrence of a fault to ground on the polyphase circuit associated with the other connection.

By the term "star-connected," I mean to include the connection commonly referred to as the zigzag connection. Also, wherever a multiplicity of polyphase windings is mentioned herein, it is to be understood that they may be star or zigzag or any combination of these two types of windings.

My invention will be better understood from the following description when considered in connection with the accompanying two sheets of drawings, and its scope will be pointed out in the appended claims.

Figure 2:
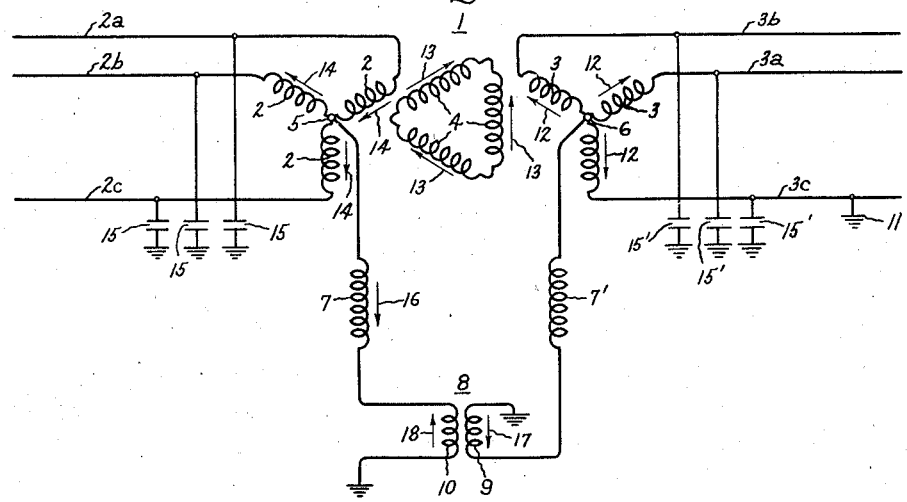
Figure 3:
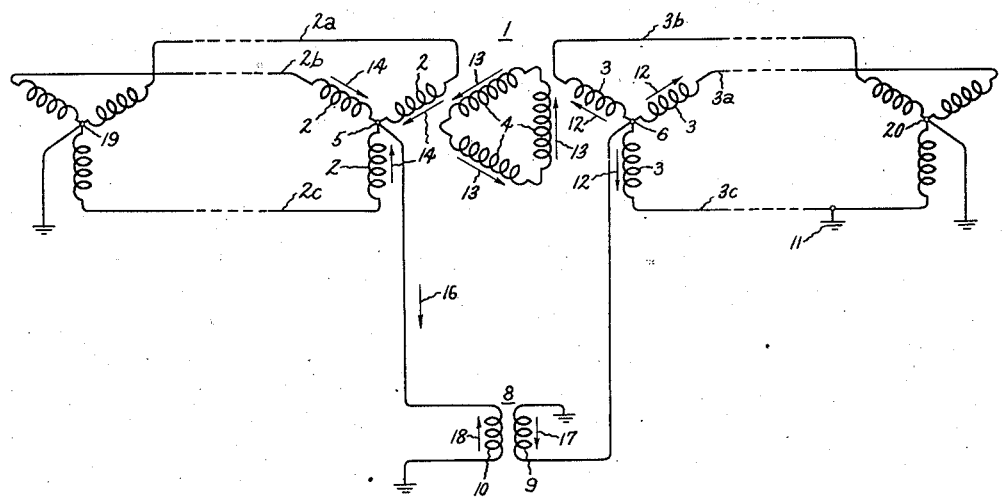

In the accompanying two sheets of drawings, Fig. 1 diagrammatically illustrates an embodiment of my invention as applied to a three-phase alternating current electric system embodying a star-delta-star connected power transformer with one neutral point grounded directly and the other grounded through a ground fault neutralizer; Fig. 2 is similar to the diagram shown in Fig. 1 except that each set of star-connected windings is grounded through a ground fault neutralizer; and Fig. 3 is similar to the diagram shown in Fig. 1 except that the neutral point of each set of star-connected windings is grounded directly.

The circuit diagram of Fig. 1 illustrates a three-phase alternating current system comprising a multiwinding transformer 1 having two sets of star-connected windings 2 and 3 and a set of delta-connected windings 4. This transformer may be a polyphase transformer or a bank of single phase transformers. In general, such transformers have a low zero-phase sequence reactance relatively to their positive-phase sequence magnetizing reactance. To the star-connected windings 2 and 3, there are respectively connected the phase conductors 2a, 2b, 2c and 3a, 3b, 3c. To the delta-connected windings 4, there may also be connected the phase conductors of another three-phase circuit, but since this is immaterial to my invention, this third circuit is omitted. The two sets of star-connected windings 2 and 3 have neutrals 5 and 6, respectively. The neutral 5 is connected to ground through a zero-phase sequence inductance connection after the manner and for the purpose disclosed in United States Letters Patent 1,537,371. In accordance with the disclosure in this patent, the inductance of this connection is such as to provide on the occurrence of a ground fault on one of the phase conductors 2a, 2b, 2c a lagging current sufficient to suppress the capacitance current to ground of the ungrounded conductors. For this purpose, the connection includes a ground fault neutralizer 7, the inductance of which constitutes the major portion of the inductance of the ground connection of the neutral 5. It is assumed that any other neutrals on the circuit 2a, 2b, 2c are isolated at least to the same extent as the neutral 5. Except as will hereinafter appear, the neutral 6 is directly grounded although it may have any desired impedance value in its ground connection.

In accordance with my invention, I provide means operative on the occurrence of a ground on either of the polyphase circuits 2a, 2b, 2c and 3a, 3b, 3c for limiting or suppressing the flow of zero-phase sequence current in the neutral-to-ground connection of the transformer windings connected to the other polyphase circuit in consequence of the mutual inductance of the power transformer windings. As shown, this current limiting means is an auxiliary transforming device 8 having two mutually coupled windings 9 and 10 respectively connected in opposed order in the neutral-to-ground connections of the two sets of star-connected power transformer windings 3 and 2. The transforming device 8 preferably has low magnetizing reactance. The windings 9 and 10 are so proportioned as to impose on either neutral-to-ground connection a zero-phase sequence voltage substantially equal and opposite in phase to the zero-phase sequence voltage imposed on the connection by the mutual inductance of the power transformer windings upon the occurrence of a fault to ground on the polyphase circuit associated with the other neutral-to-ground connection. For simplicity and economy in insulation, the winding 10 is preferably connected on the ground side of the ground fault neutralizer 7.

Assuming now a fault to ground on the conductor 3c of the three-phase circuit 3a, 3b, 3c as indicated at 11, then zero-phase sequence current flows in the star-connected windings 3 as indicated by the arrows 12. Because of the mutually inductive relation of the power transformer windings 2, 3 and 4, zero-phase sequence voltages are induced in the windings 2 and 4. These voltages cause currents to flow in the windings 4 as indicated by the arrow 13 and in the windings 2 as indicated by the arrows 14. In consequence of the proportioning of the inductance of the connection to ground from the neutral point 5, a series resonant circuit is established with the zero-phase sequence capacitances to ground of the phase conductors 2a, 2b and 2c. This capacitance to ground is indicated by the condensers 15. Accordingly, a relatively large current 16 tends to flow in the connection to ground from the neutral 5. This produces a voltage drop across the ground fault neutralizer 7 and raises the neutral 5 to some voltage above ground. If the mutual inductance between the sets of star-connected windings 2 and 3 is greater than one-tenth of the magnitude of the zero-phase sequence reactance of the windings 3, the voltage induced in this series resonant circuit is quite likely to cause excessive voltages on the A.-C. system comprising the power transformer 1 and its connected circuits. However, the zero-phase sequence current flowing in the connection to ground from the neutral 6, in the direction indicated by the arrow 17, in the winding 9 of the auxiliary transforming device 8 induces in the winding 10 of this device a voltage which tends to cause a current to flow in the direction indicated by the arrow 18. This voltage, by virtue of the proportioning of the windings 9 and 10 and their opposed relation connection, is substantially equal to and opposite in direction to the mutual zero-phase sequence voltage of the series resonant circuit so as effectively to suppress any current flow in the series resonant circuit and thus prevent excess voltages.

Since the ground fault neutralizer 7 can suppress only ground faults of a transitory character, it is customary in case of permanent ground faults to short circuit the ground fault neutralizer 7 as disclosed, for example, in United States Letters Patent 1,378,557, so that the usual ground fault protective relays associated with the circuit 2a, 2b, 2c can clear a ground fault through the operation of the circuit breakers associated with this circuit. Since these form no part of my invention, they are not illustrated. However, in case the ground fault neutralizer 7 is short circuited, a relatively large zero-phase sequence current tends to flow in the connection to ground from the neutral 5. Because of the mutually inductive relation of the power transformer windings 2 and 3, a zero-phase sequence current is established in the windings 3. Assuming there is no ground fault on the circuit 3a, 3b, 3c, the only way this current can flow is through the conductors 3a, 3b and 3c to some other grounded neutral point on the circuit of these conductors and thence by way of the ground connection to the neutral point 6. This zero-phase sequence current flowing in the conductors 3a, 3b and 3c can well be of a magnitude such as to cause the operation of ground fault relays and circuit breakers associated with the circuit 3a, 3b, 3c. In this case, there would be an unnecessary interruption of service on this circuit. However, under these conditions, the auxiliary transforming device 8 operates as before with the current flowing to ground from the neutral point 5 through the winding 10 inducing a voltage in the winding 9 to oppose the zero-phase sequence voltage in the windings 3 resulting from the mutually inductive relation of the windings 2 and 3.

In the embodiment of my invention shown in Fig. 2, it is assumed that the neutral point 6 is also grounded in a manner similar to the grounding of the neutral point 5 with a ground fault neutralizer 7' in the inductive connection from the neutral 6 to ground. If it be assumed now that a fault to ground occurs on the conductor 3c as indicated at 11, then in the event that this fault is of a permanent character and it becomes necessary to short circuit or by-pass the ground fault neutralizer 7' as disclosed in United States Letters Patent 1,378,557, then conditions are as shown in Fig. 1 and the excess voltage dangers which may arise because of the series resonant circuit embodying the ground fault neutralizer 7 and the zero-phase sequence capacitances 15 of the conductors 2a, 2b and 2c are prevented by the action of the voltages induced in the windings 9 and 10 of the auxiliary transforming device 8 after the manner described in connection with the operation of Fig. 1. In neither of the arrangements shown in Fig. 1 or 2, however, does the action of this transforming device interfere with the suppressor action of the ground fault neutralizers 7 or 7'.

In case of a ground on one of the phase conductors 2a, 2b, 2c, similar dangerous voltage conditions are possible by reason of the series resonant circuit including the ground fault neutralizer 7' and the capacitances 15' to ground of the phase conductors 3a, 3b, 3c. Here again, however, the auxiliary transformer 8 suppresses the zero-phase sequence current tending to flow in the series resonant circuit by reason of the mutual coupling of the windings 3 and 4.

In the embodiment of my invention shown in Fig. 3, it is assumed that the neutrals 5 and 6 are grounded directly except for the windings 9 and 10 of the auxiliary transforming device 8. It is also assumed that the circuit 2a, 2b, 2c has at least one other neutral point 19 which is substantially directly grounded and the circuit 3a, 3b, 3c has at least one other neutral point 20 which is also substantially directly grounded. In this arrangement, it will be obvious that in case of a ground on the conductor 3c, as indicated at 11, zero-phase sequence currents will be induced in the windings 2 as described in connection with the embodiment of my invention shown in Fig. 1. In this case, however, the zero-phase sequence currents flowing in the circuit conductors 2a, 2b and 2c, flow to ground by way of the ground connection at the neutral point 19. Obviously, in so doing, these currents if of sufficient magnitude will effect the operation of whatever ground current relaying is associated with the circuit 2a, 2b, 2c and hence cause an unnecessary interruption of service on this circuit. However, as heretofore described, the fault current flowing to ground from the neutral 6 of the circuit 3a, 3b, 3c to ground by way of the auxiliary transformer winding 9 induces in the associated winding 10 a voltage which is substantially equal and opposite to the zero-phase sequence voltage which tends to cause current to flow from the neutral 5 to ground and by way of the neutral 19 to the phase conductors 2a, 2b, 2c. Accordingly, the mutually induced zero-phase sequence current which tends to flow in the power transformer windings 2 is suppressed and is ineffective to produce any false operation of whatever ground fault protective apparatus is associated with the circuit 2a, 2b, 2c. It will be apparent that in case of a ground on one of the phase conductors 2a, 2b, 2c, a similar effect is produced on the circuit 3a, 3b, 3c so as to prevent false operation of any ground fault protective apparatus associated therewith.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In a polyphase alternating current system wherein two polyphase circuits are respectively connected to two sets of star-connected mutually coupled windings, the combination with said windings of a transforming device comprising two mutually coupled windings respectively connected in opposed relation between the neutrals of said sets of star-connected windings and ground and so proportioned as to impose on one neutral a voltage substantially equal and opposite in phase to the voltage imposed on said one neutral by the mutual inductance of said two sets of star-connected windings upon the occurrence of a fault to ground on the polyphase circuit associated with the other neutral.

2. In a polyphase alternating current system wherein two polyphase circuits are respectively connected to two sets of star-connected mutually coupled windings and wherein a neutralizer connection to ground from the neutral of each of said sets of star-connected windings is proportioned to have an inductance substantially equal to the capacitance to ground of the associated circuit, the combination with said windings and said connections of a transforming device comprising two mutually coupled windings respectively connected in opposed relation in said neutralizer connections and so proportioned as to impose on either of said connections a voltage substantially equal and opposite in phase to the voltage imposed upon either of said neutralizer connections by the mutual inductance of said two sets of star-connected windings upon the occurrence of a fault to ground on the polyphase circuit associated with the other neutralizer connection.

3. In a polyphase alternating current system wherein a multiwinding power transformer has a low zero-phase sequence reactance relatively to its positive-phase sequence magnetizing reactance and at least two sets of star-connected windings respectively connected to two polyphase circuits of the system and wherein the neutral of each set of windings is connected to ground, means operative on the occurrence of a ground on either polyphase circuit for limiting the flow of zero-phase sequence current in the neutral-to-ground connection of the set of windings connected to the other polyphase circuit comprising an auxiliary two-winding transforming device having low magnetizing reactance, the windings of said device being respectively connected in opposed order in the neutral-to-ground connections of the two sets of star-connected windings and so proportioned as to impose on either connection a zero-phase sequence voltage substantially equal and opposite in phase to the zero-phase sequence voltage produced by the mutual inductance of the power transformer windings upon the occurrence of a fault to ground on either of the polyphase circuits.

4. In a polyphase alternating current system wherein a multiwinding power transformer has a low zero-phase sequence reactance relatively to its positive-phase sequence magnetizing reactance and at least two sets of star-connected windings respectively connected to two polyphase circuits of the system and wherein the neutral of each set of windings is connected to ground and wherein each neutral-to-ground connection has a zero-phase sequence inductance proportioned to provide on the occurrence of a ground on a phase conductor of the associated circuit a lagging current for effectively suppressing the capacitance current to ground at the grounded point, means operative on the occurrence of a ground on either polyphase circuit for limiting the flow of zero-phase sequence current in the neutral-to-ground connection of the set of windings connected to the other polyphase circuit comprising an auxiliary two-winding transforming device having low magnetizing reactance, the windings of said device being respectively connected in opposed order in the neutral-to-ground connections of the two sets of star-connected windings and so proportioned as to impose on either of said neutral-to-ground connections a zero-phase sequence voltage substantially equal and opposite in phase to the zero-phase sequence voltage produced by the mutual inductance of the power transformer windings upon the occurrence of a fault to ground on the other polyphase circuit.

5. In a polyphase alternating current system wherein a multiwinding power transformer has a low zero-phase sequence reactance relatively to its positive-phase sequence magnetizing reactance and at least two sets of star-connected windings respectively connected to two polyphase circuits of the system and wherein the neutral of each set of windings is connected to ground, the combination with said power transformer of means operative on the occurrence of a ground on one polyphase circuit for limiting the flow of zero-phase sequence current in the neutral-to-ground connection of the transformer windings connected to the other polyphase circuit comprising an auxiliary two-winding transforming device having low magnetizing reactance, the windings of said device being respectively connected in opposed order in the neutral-to-ground connections of the two sets of star-connected windings and so proportioned as to impose on one connection a zero-phase sequence voltage substantially equal and opposite in phase to the zero-phase sequence voltage imposed on the one connection by the mutual inductance of the power transformer windings upon the occurrence of a fault to ground on the polyphase circuit associated with the other connection.

6. In a polyphase alternating current system wherein a multiwinding power transformer has a low zero-phase sequence reactance relatively to its positive-phase sequence magnetizing reactance and at least two sets of star-connected windings respectively connected to two polyphase circuits of the system and wherein the neutral of each set of windings is connected to ground and wherein the neutral-to-ground connection of the set of windings associated with one polyphase circuit has a zero-phase sequence inductance proportioned to provide on the occurrence of a ground on a phase conductor of the one polyphase circuit a lagging current for effectively suppressing the capacitance current to ground at the grounded point, means operative on the occurrence of a ground on the other polyphase circuit for limiting the flow of zero-phase sequence current in the neutral-to-ground connection of the set of windings connected to the one polyphase circuit comprising an auxiliary two-winding transforming device having low magnetizing reactance, the windings of said device being respectively connected in opposed order in the neutral-to-ground connections of the two sets of star-connected windings and so proportioned as to impose on the neutral-to-ground connection of the set of windings associated with the one polyphase circuit a zero-phase sequence voltage substantially equal and opposite in phase to the zero-phase sequence voltage produced by the mutual inductance of the power transformer windings upon the occurrence of a fault to ground on the other polyphase circuit.

PHILIP H. LIGHT.